United States Patent
Stolbikov et al.

(10) Patent No.: US 10,846,386 B2
(45) Date of Patent: Nov. 24, 2020

(54) PULSE SENSORS FOR BIOMETRIC IDENTIFICATION

(71) Applicant: Lenovo (Singapore) Pte. Ltd., Singapore (SG)

(72) Inventors: Igor Stolbikov, Apex, NC (US); David Rivera, Raleigh, NC (US); Rod D. Waltermann, Rougemont, NC (US); Timothy Winthrop Kingsbury, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 34 days.

(21) Appl. No.: 15/243,426

(22) Filed: Aug. 22, 2016

(65) Prior Publication Data

US 2018/0052983 A1    Feb. 22, 2018

(51) Int. Cl.
*G06F 21/32* (2013.01)
*G06F 21/00* (2013.01)
*G06F 21/31* (2013.01)

(52) U.S. Cl.
CPC ............ *G06F 21/32* (2013.01); *G06F 21/316* (2013.01)

(58) Field of Classification Search
CPC ................................ G06F 21/316; G06F 21/32
See application file for complete search history.

(56) References Cited

U.S. PATENT DOCUMENTS

| | | | | |
|---|---|---|---|---|
| 8,902,045 B1* | 12/2014 | Linn | ............. | G06F 21/32 340/5.53 |
| 2005/0177735 A1* | 8/2005 | Arnouse | ............. | G06F 21/32 713/186 |
| 2006/0103731 A1* | 5/2006 | Pilu | ............. | H04N 1/3873 348/207.99 |
| 2010/0311482 A1* | 12/2010 | Lange | ............. | A61B 5/0404 463/1 |
| 2011/0254662 A1* | 10/2011 | Lindsay | ............. | G06F 19/00 340/5.82 |
| 2012/0200601 A1* | 8/2012 | Osterhout | ............. | G02B 27/0093 345/633 |
| 2014/0016834 A1* | 1/2014 | Endoh | ............. | G06F 21/32 382/115 |
| 2014/0181959 A1* | 6/2014 | Li | ............. | G06F 21/32 726/19 |
| 2014/0196131 A1* | 7/2014 | Lee | ............. | G06F 21/35 726/7 |

(Continued)

FOREIGN PATENT DOCUMENTS

CN    104657852 A    5/2015
CN    204926092 U    12/2015

OTHER PUBLICATIONS

Nadort, "The Hand Vein Pattern Used as a Biometric Feature" May 2007, Free University, Master Literature Thesis, pp. 8-28 and 36-90 (Year: 2007).*

(Continued)

*Primary Examiner* — Mohammad A Siddiqi
(74) *Attorney, Agent, or Firm* — Ference & Associates LLC

(57) ABSTRACT

One embodiment provides a method, including: obtaining, using one or more pulse sensors, user pulse data from two or more points; and identifying, using a processor, a user based on the user pulse data. Other aspects are described and claimed.

20 Claims, 4 Drawing Sheets

(56) References Cited

U.S. PATENT DOCUMENTS

| | | | | |
|---|---|---|---|---|
| 2015/0223731 A1* | 8/2015 | Sahin | ............... | A61B 5/16 |
| | | | | 600/301 |
| 2015/0288810 A1* | 10/2015 | Hodge | ............... | H04M 1/67 |
| | | | | 379/88.02 |
| 2016/0034679 A1 | 2/2016 | Yun et al. | | |
| 2016/0182503 A1* | 6/2016 | Cheng | ............... | H04L 63/0861 |
| | | | | 726/7 |
| 2016/0302677 A1* | 10/2016 | He | ............... | A61B 5/02125 |
| 2016/0366128 A1* | 12/2016 | Dascola | ............... | H04L 63/0861 |
| 2017/0006155 A1* | 1/2017 | Hodge | ............... | H04M 1/67 |
| 2017/0006214 A1* | 1/2017 | Andreassen | ............... | G06F 16/783 |
| 2017/0105622 A1* | 4/2017 | Boesen | ............... | H04W 76/14 |
| 2017/0258329 A1* | 9/2017 | Marsh | ............... | G01J 5/0215 |

OTHER PUBLICATIONS

Vallabh, "Authentication using Finger-Vein Recognition" 2012 University of Johannesburg, pp. 2-9, 70-93 and 116-145 (Year: 2012).*

* cited by examiner

PULSE SENSORS FOR BIOMETRIC IDENTIFICATION

BACKGROUND

Biometric identification is utilized in many circumstances. For example, security mechanisms often are based on, or include, use of a biometric component such as a fingerprint reader, an iris scanner, a voice recognition mechanism, an image analysis/facial detection mechanism, etc., that can be used to identify a particular user. For example, system access (e.g., login credentialing) might be conditioned on a biometric identification. In addition to security mechanisms, biometric identification is utilized to customize a system or device. For example, biometric identification might be used to properly identify a particular user and thereafter load the particular user's preferred device settings.

BRIEF SUMMARY

In summary, one aspect provides a method, comprising: obtaining, using one or more pulse sensors, user pulse data from two or more points; and identifying, using a processor, a user based on the user pulse data.

Another aspect provides a device, comprising: a pulse sensor; a processor operatively coupled to the pulse sensor; and a memory that stores instructions executable by the processor to: obtain, from the pulse sensor, user pulse data from two or more points; and identify a user based on the user pulse data.

A further aspect provides a system, comprising: a pulse sensor; and a device, comprising: a processor operatively coupled to the pulse sensor; and a memory that stores instructions executable by the processor to: obtain, using the pulse sensor, user pulse data from two or more points; and identify a user based on the user pulse data.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
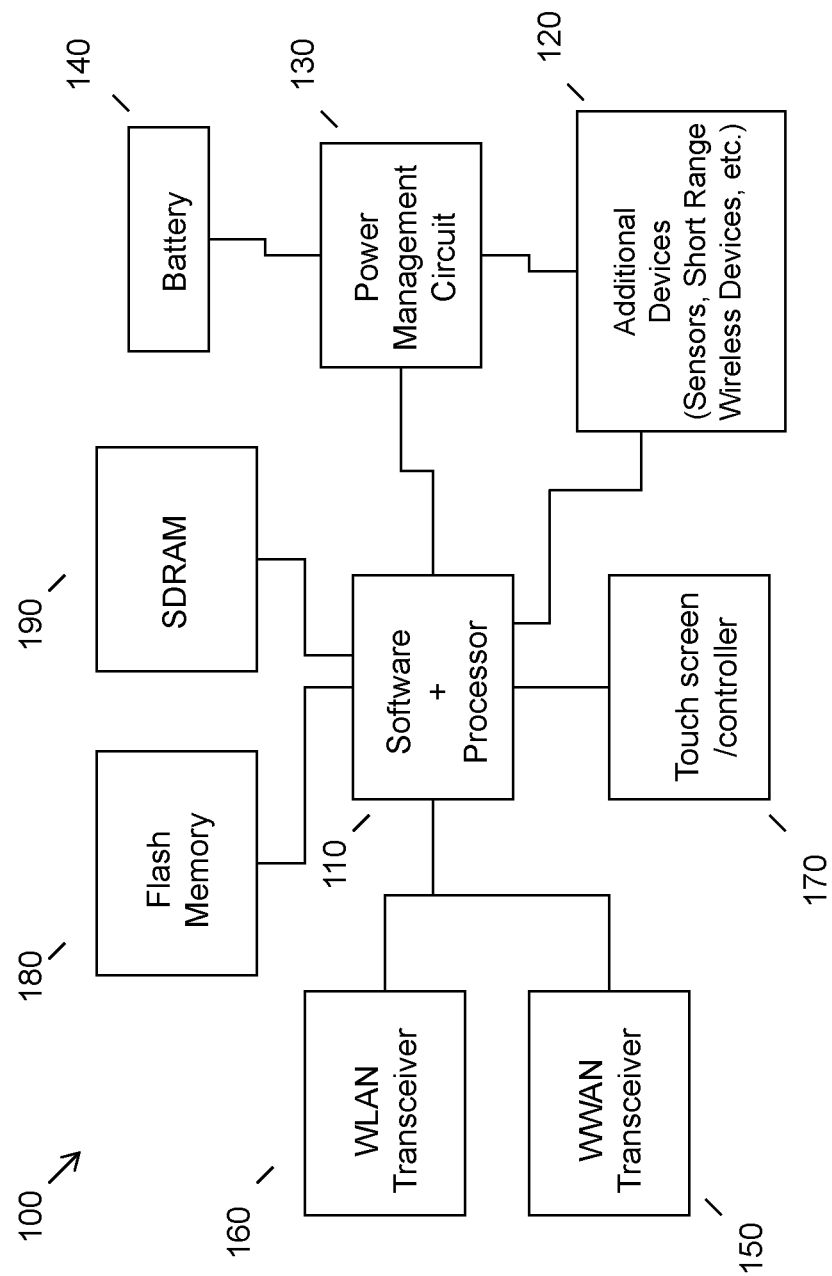
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Many access control systems include a traditional authentication procedure using something you know (e.g., password) or something you have (e.g., a smart card) along with a third factor, i.e., something you are, which is a form of biometric authentication. This third layer of security comes in many flavors, e.g., fingerprint authentication using fingerprint readers on laptops that login with a single finger swipe, iris scanners that are used as auxiliary authentication for accessing secure facilities, etc.

A flaw with biometric security measures is the risk of false negatives or false positives. Issues with accuracy can prevent a valid user from being properly recognized. Alternately, an imposter could successfully impersonate a legitimate user by providing high resolution images (for spoofing facial detection systems) or recordings (for spoofing voice based authentication system) that might be recognized as a valid user.

An embodiment provides an alternative method of biometric identification that uses sensor(s) to measure a user's pulse at more than one bodily location, i.e., at two or more measurement points. In an embodiment, a pulse wave measurement is collected and correlated to at least one other pulse wave measurement, i.e., collected at a different point or location. The biometric pulse data that is captured using these measurement points is transformed into biometric signature data that is unique for each human being. The ability to uniquely identify and authenticate a user is related to subtle differences in the pulse wave characteristics and measured blood flow when taken from the different measurement points.

Pulse wave collection methods are able to retrieve a significant number of intra-beat features (e.g., up to 15) based on the human physiology. Intra-beat features may include, but are not necessarily limited to, pulse wave velocity as determined via a plurality of measurement points. Collected characteristics are unique due to morphology and amplitudes of recorded cardiac complexes, which are governed by multiple individual factors, in particular by the shape and position of the heart, person physical characteristics, and the presence and nature of pathologies, among other factors. Collected pulse measurement data are independent from the measurement positions (e.g., neck pulse, left or right hand pulse, temple pulse, intraocular/eye pulse, etc.), invariant to the individual's state of anxiety, and unique to an individual.

The pulse measurements may be gathered using a variety of sensors including remote cameras or wearable devices on the fingers, wrists, temples, eyes, or through other similar means. It is also possible for a single wearable device to collect the pulse from multiple points.

Biometric identification of a user may occur before or after allowing access to a device or a secured resource, or biometric identification may be performed continuously, intermittently, or as an ongoing authentication procedure, e.g., performed during the entire time that the user is accessing the device or resource.

The illustrated example embodiments will be best understood by reference to the figures. The following description is intended only by way of example, and simply illustrates certain example embodiments.

While various other circuits, circuitry or components may be utilized in information handling devices, with regard to mobile device circuitry 100, an example illustrated in FIG. 1 includes a system on a chip design found for example in many smaller or mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included and may be added based on a particular design. For example, additional devices 120 may include a sensor or sensor(s), for example an optical sensor such as a camera and/or an infrared sensor, light emitting diode (LED) or other light based sensors, etc., as well as short range wireless devices, e.g., BLUETOOTH wireless communication devices. System 100 often includes a touch screen 170 for data input and display/rendering. System 100 also typically includes various memory devices, for example flash memory 180 and SDRAM 190.

Figure 2:
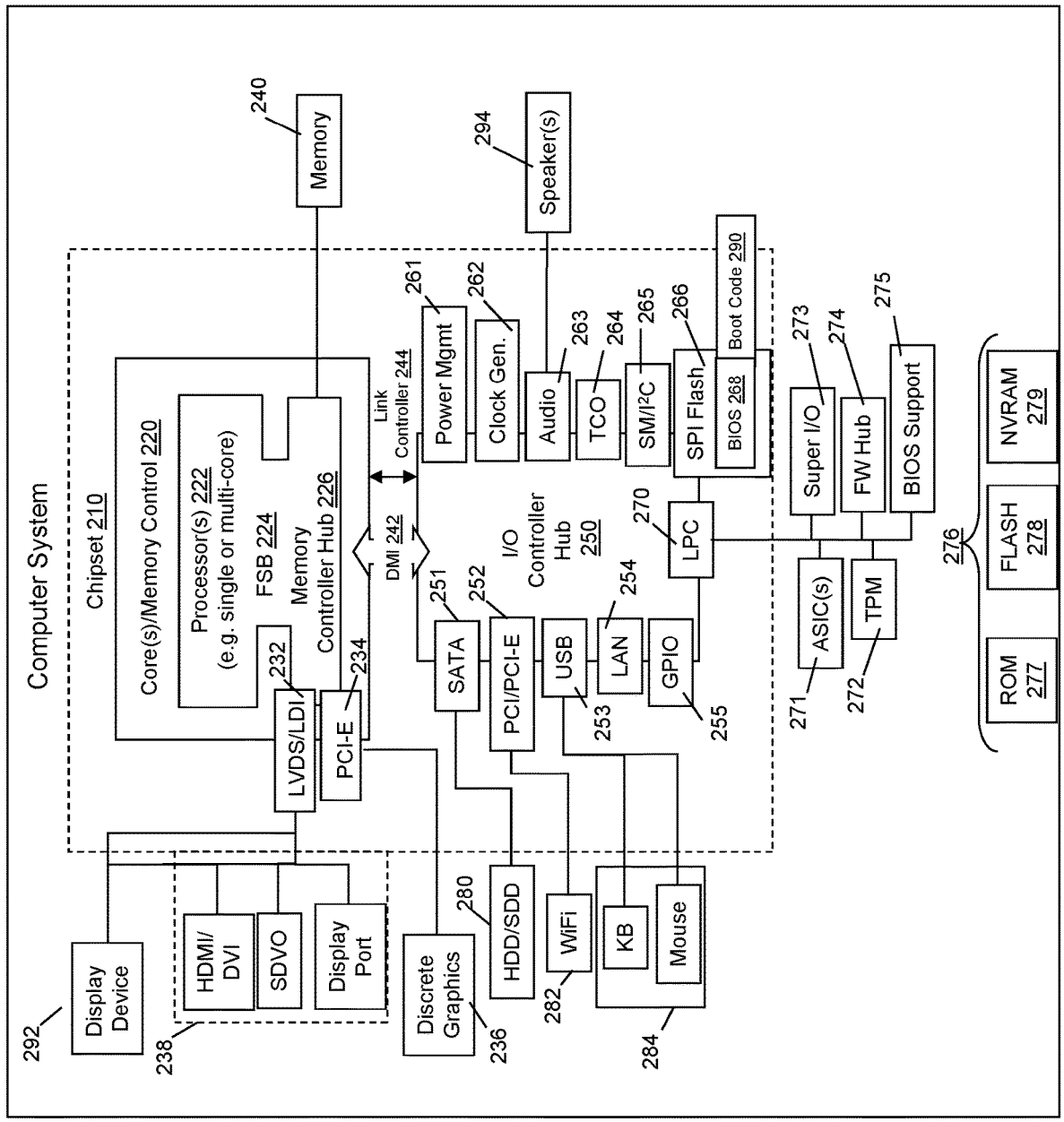
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, biometric data capture device, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as a wearable device (e.g., smart watch, glasses) or a computing device (e.g., tablet, laptop, desktop) that obtains user pulse data and uses the same to conduct biometric identification of a user. For example, the circuitry outlined in FIG. 1 might be included in a wearable device such as a smart watch that contains LED sensors to obtain user pulse data, where inputs from sensors providing user pulse data are utilized to perform biometric identification. As another example, the circuitry outlined in FIG. 2 might be included in a desktop or laptop computer, an onboard vehicle computer, or any secured device or resource that obtains user pulse data to perform biometric identification, e.g., from sensors disposed on or viewing a user. As will be appreciated by reviewing this description, other types of devices may be utilized. For example, the circuitry outlined in FIG. 1 and/or FIG. 2 may be included in a smart TV or other media player, where user pulse data is derived from a camera, from a wearable device, or a combination of the foregoing and used to grant access to such a device.

Figure 3:
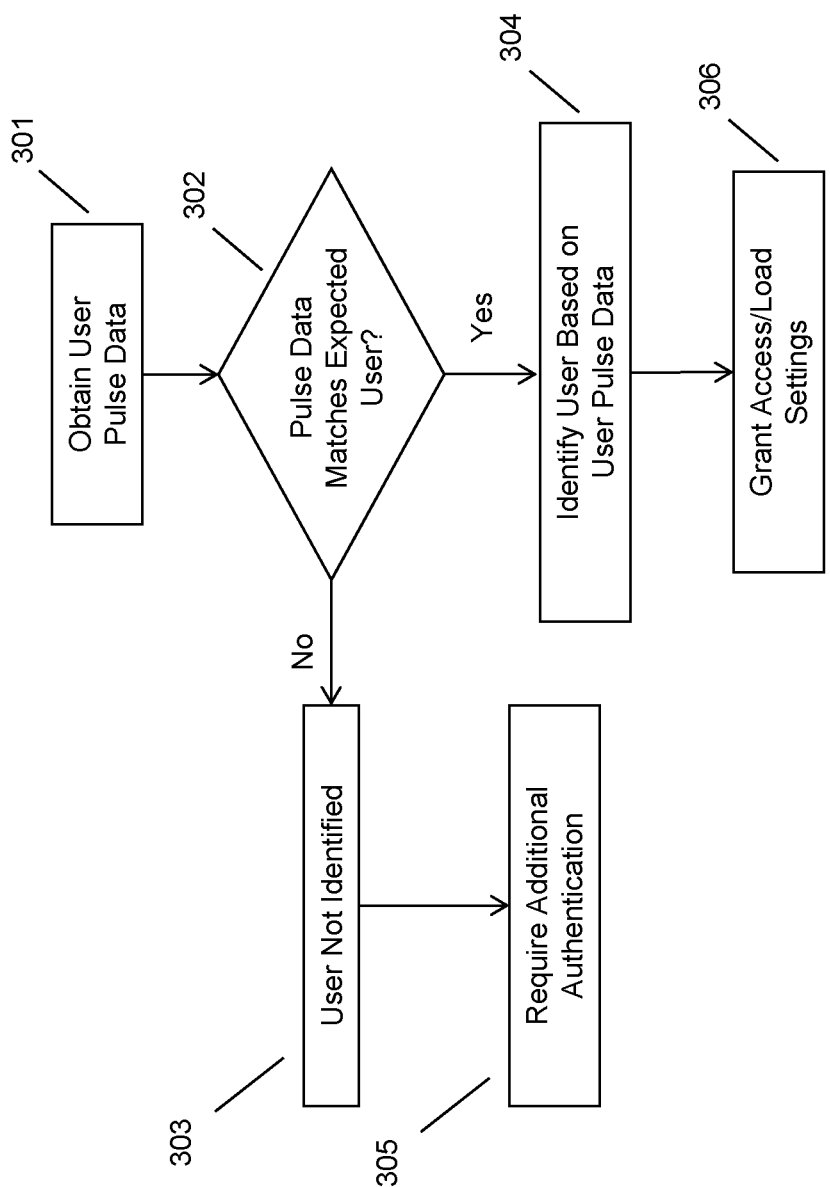
FIG. 3 illustrates an example method of biometric identification using pulse data.

Turning to FIG. 3, an embodiment obtains user pulse data at 301, e.g., from LED sensors disposed in a wearable device, from a camera disposed in a pair of glasses or operatively viewing the user, etc. The user pulse data may include pulse data that permits an inference as to the user's identity.

User pulse data may take a variety of forms. For example, the user pulse data obtained at 301 may include LED/light reflection data collected from LEDs included in a wearable device and reported wirelessly to a device such as a car's onboard computer, a desktop or laptop computer and/or a media player within wireless range of the wearable device, etc. The LED/light reflection data may indicate the relative width of a user's blood vessel at a measurement point in time or change of the relative width of a user's blood vessel over a time window. As another example, user pulse data might include image data collected from a camera or other sensor, e.g., an ultrasound sensor, where the image data permits an inference or calculation of a user's pulse characteristics (e.g., change in blood vessel width at a given time or over a time window). As will be appreciated by those having skill in the art, various types of user pulse data may be combined to provide a biometric signature of a particular user. This biometric signature may be refined over time, e.g., by collecting user pulse data repeatedly and updating a user's biometric signature.

The user pulse data obtained at 301 is used to determine if the user pulse data matches expected user pulse data at 302. That is, the currently detected user pulse data obtained at 301 is compared to known user pulse data of a particular user in order to identify the particular user. The known user pulse data may be stored locally or accessed from a remote device. The known user pulse data may include a biometric signature or profile that has been generated based on historically detected user pulse data.

If the user is identified, as illustrated at 304, using the user pulse data obtained at 301, i.e., the currently detected user pulse data (such as pulse wave data) is similar or equivalent to known user pulse data, the user may be granted access to a device, have continued access to a device, or have particular settings (e.g., user-specific or customized settings) loaded, as illustrated at 306. Otherwise, i.e., if a user is not identified at 302, as illustrated at 303, the lack of user identification may lead to a requirement for further authentication data, as illustrated at 305, and/or may result in reduced device functionality.

For example, a guest setting may be applied to a desktop computer or a media player (e.g., smart TV) if a particular user is not identified at 302. Similarly, if a particular user is not identified at 302, a valet setting may be applied to an automobile computer or other vehicle-connected device (e.g., smart phone). The guest or valet setting may include reduced access to certain applications or device features. By way of specific example, if a particular user is identified at 302, full device access or user-specific device access is granted at 306, e.g., an address book may be accessible, a communication application may be accessible, and a navigation application may be accessible. In contrast, i.e., if a particular user is not identified at 302, reduced functionality may be implemented for a given device. For example, an address book, a communication application, and a navigation application may be locked until further or additional authentication is provided, as illustrated at 305.

As described herein, the biometric identification may be included in a security mechanism for a device such as a laptop or desktop computer, a media player or smart TV, a car's on-board computer, etc. Thus, if a user is identified using the user pulse data, some user-specific functionality may be provided by the device. In contrast, if the particular user is not identified using the user pulse data, a reduce functionality or guest setting may be applied, subject to further identification being made, e.g., using a password or alternative biometric identification (fingerprint reader, voice authentication system, etc.).

User pulse data is collected at two or more points in order to offer a more accurate identification of the user. For example, an embodiment may measure two or more different blood vessels of a user to obtain user pulse data for each. The two or more measurements are combined or correlated with one another to further refine or improve the biometric identification. In an embodiment, for example, two or more LEDs may be proved, e.g., on opposite sides of a wearable device such as a smart watch, in order to obtain the user pulse data at multiple locations. The pulse data for the multiple locations can be compared (as to time and magnitude, e.g., of a pulse wave) in order to form a biometric signature for the user. As another example, a camera or other sensor may sample or obtain image data of two or more different blood vessels, e.g., in the user's eye, in order to derive user pulse data, e.g., pulse wave data, for use in biometric identification of a user.

An embodiment may obtain user pulse data for use at various times. For example, an embodiment may utilize user pulse data on an on-going basis. By way of specific example, user pulse data may be obtained at 301, and a determination made at 302, repeatedly, e.g., according to a policy as a user operates a device. Thus, the user may be initially granted access (with or without use of pulse-based biometric identification) and thereafter may be required to continue to supply correct user pulse data in order to maintain the level of access to the device. This permits the use of user pulse data to supplement other types of security mechanisms that might be applied, e.g., other biometric identification techniques, smart card security techniques, alphanumeric password based identification, etc.

Figure 4:
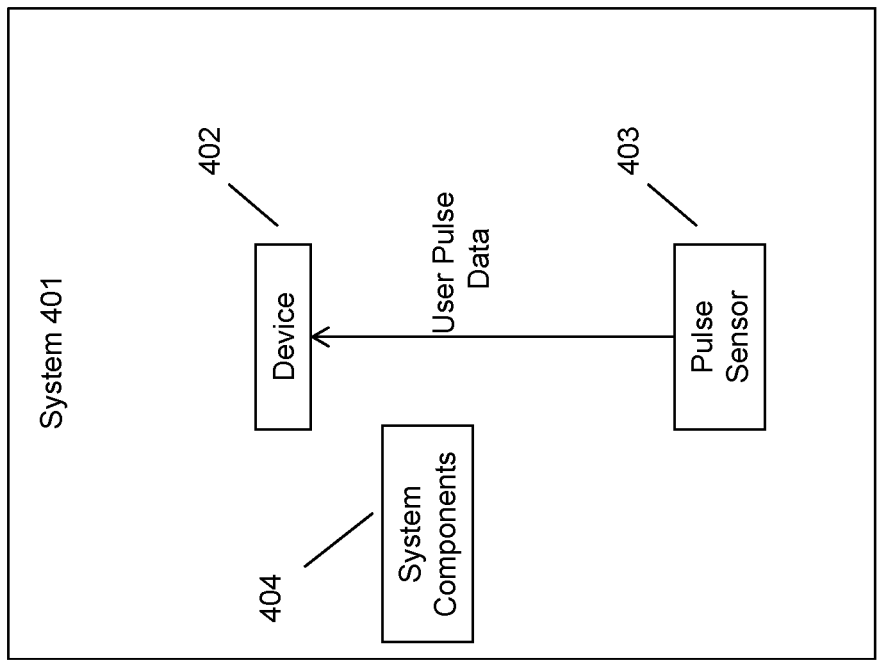
FIG. 4 illustrates an example system that uses pulse data for biometric identification.

The use of pulse data in biometric identification may be applied in a wide variety of system types. Turning to FIG. 4, an example system 401 is illustrated. As shown, a system 401 may include a combination of: a device 402 (such as a computing device selected from the group consisting of a personal computer (e.g., tablet, laptop, desktop, etc.), a media device such as a smart TV, and a vehicle's onboard computer (e.g., onboard car computer)); and a pulse sensor 403 (such as a wearable device including LEDs/photodetectors, a camera or other image sensor, etc.). The system 401 may include various other system components 404, e.g., peripheral devices that communicate with the device 402 and/or the pulse sensor 403, vehicle components such as an engine, wheels, etc.

An embodiment uses pulse data to supplement other biometric based security measures, e.g., for devices 402 such as computers. In an embodiment, biometric pulse data is used as one of multiple layers of biometric security for granting or denying access or an access type to a device 402.

Data about a user's pulse can be gathered from a variety of sensors, e.g., a pulse sensor 403 may be integrated into a wearable device such as a smart watch, glasses, etc. The pulse sensor(s) 403 provide dynamic biometric based measurements, for example measurements of pulse wave data at two or more measurement points on the user. As described herein, over time, a system 401 can learn the user's pulse data in order to form a biometric signature for that user.

In an embodiment, pulse based biometric data is used on an ongoing basis. For example, in the case where multiple users share the same device 402, a user's pulse data may provide an additional hint to help determine the user's identity in terms of current use of the device 402.

As an example, if a different driver sits down in another user's car seat, the user's pulse data might be used to flag the user as different or non-matching, e.g., as illustrated at 302, 303 of FIG. 3. For example, pulse wave data might not be correct in terms of an expected user's pulse wave data. Thus, if the pulse data does not match the expected user's pulse data, then different settings (e.g., vehicle settings) might be implemented, e.g., the vehicle's electronics might be set to a valet mode, the vehicle's seat may be automatically moved or adjusted, the vehicle compartment may be adjusted, etc.

An embodiment provides continuous, periodic or intermittent authentication using pulse data. For example, as the user works with the device 402 over time, the user's pulse data as sensed by a pulse sensor 403 are monitored. If the user's pulse data changes substantially, then the device 402 will automatically lock itself and require additional authentication. Alternatively, if a user's identity is called into question, instead of locking the device, the device could move into a reduced privilege or guest mode, e.g., where only limited functionality is available without further authentication.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, R F, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
    obtaining, using one or more pulse sensors, user pulse data from each of two or more points, each of the two or more points being at a different location of a body of a user as compared to another of the two or more points, wherein the pulse data comprises a pulse wave measurement, wherein the pulse wave measurement comprises intra-beat features dependent upon a physiology of the user and wherein the pulse wave measurement is independent of the location of the body the pulse wave measurement is captured from;
    forming a biometric signature for the user by correlating the user pulse data obtained from one of the two or more points with the user pulse data obtained from another of the two or more points to create a refined biometric signature, wherein the pulse data comprises utilizing at least one of: pulse wave characteristics obtained from the two or more points and measured blood flow obtained from the two or more points; and identifying, using a processor, the user from the obtained user pulse data, wherein the identifying the user comprises comparing the biometric signature to known biometric signatures.

2. The method of claim 1, further comprising adjusting, using a processor, a setting of a device based on the user identified.

3. The method of claim 2, wherein the adjusting comprises granting access to the device.

4. The method of claim 2, wherein the adjusting comprises granting a type of access to the device.

5. The method of claim 4, wherein granting a type of access to the device comprises granting access to a device feature selected from the group consisting of an address book, a communication application, and a navigation application.

6. The method of claim 1, wherein the obtaining comprises obtaining reflected light.

7. The method of claim 1, wherein the obtaining comprises obtaining image data.

8. The method of claim 1, wherein the two or more points comprise two or more independent blood vessel measurement points.

9. The method of claim 8, wherein the two or more independent blood vessel measurement points comprise measurement points for two or more different blood vessels.

10. The method of claim 1, wherein the pulse wave information comprises intra-beat features associated with a user's human physiology.

11. A device, comprising:
a pulse sensor;
a processor operatively coupled to the pulse sensor; and
a memory that stores instructions executable by the processor to:
obtain, from the pulse sensor, user pulse data from each of two or more points, each of the two or more points being at a different location of a body of a user as compared to another of the two or more points, wherein the pulse data comprises a pulse wave measurement, wherein the pulse wave measurement comprises intra-beat features dependent upon a physiology of the user and wherein the pulse wave measurement is independent of the location of the body the pulse wave measurement is captured from wherein the pulse data comprises utilizing at least one of: pulse wave characteristics obtained from the two or more points and measured blood flow obtained from the two or more points;
form a biometric signature for the user by correlating the user pulse data obtained from one of the two or more points with the user pulse data obtained from another of the two or more points to create a refined biometric signature; and
identify the user from the obtained user pulse data, wherein the identifying the user comprises comparing the biometric signature to known biometric signatures.

12. The device of claim 11, wherein the instructions are further executable by the processor to adjust a setting of a device based on the user identified.

13. The device of claim 12, wherein the processor adjusts the setting of the device by granting access to the device.

14. The device of claim 12, wherein the granting access comprises granting a type of access to the device.

15. The device of claim 14, wherein granting a type of access to the device comprises granting access to a device feature selected from the group consisting of an address book, a communication application, and a navigation application.

16. The device of claim 11, wherein the pulse sensor comprises one or more light emitting diodes (LEDs).

17. The device of claim 11, wherein the user pulse sensor comprises an imaging device.

18. The device of claim 11, wherein the two or more points comprise two or more independent blood vessel measurement points.

19. The device of claim 11, wherein the pulse wave information comprises intra-beat features associated with a user's human physiology.

20. A system, comprising:
a pulse sensor; and
a device, comprising:
a processor operatively coupled to the pulse sensor; and
a memory that stores instructions executable by the processor to:
obtain, using the pulse sensor, user pulse data from each of two or more points, each of the two or more points being at a different location of a body of a user as compared to another of the two or more points, wherein the pulse data comprises a pulse wave measurement, wherein the pulse wave measurement comprises intra-beat features dependent upon a physiology of the user and wherein the pulse wave measurement is independent of the location of the body the pulse wave measurement is captured from wherein the pulse data comprises utilizing at least one of: pulse wave characteristics obtained from the two or more points and measured blood flow obtained from the two or more points;
form a biometric signature for the user by correlating the user pulse data obtained from one of the two or more points with the user pulse data obtained from another of the two or more points to create a refined biometric signature; and
identify the user from the obtained user pulse data, wherein the identifying the user comprises comparing the biometric signature to known biometric signatures.

* * * * *